United States Patent

[11] 3,543,861

| [72] | Inventors | Shinjiro Takakita, No. 1, 323 Kamihatsu-Cho, Ko Takakita, 3088-40, Sakuragaoka, both of Nabari-shi, Mie-ken, Japan |
|---|---|---|
| [21] | Appl. No. | 683,340 |
| [22] | Filed | Nov. 15, 1967 |
| [45] | Patented | Dec. 1, 1970 |
| [32] | Priority | Nov. 17, 1966 |
| [33] | | Japan |
| [31] | | No. 41/75,602 |

[54] APPARATUS FOR TILLING AND BREAKING SOILS
2 Claims, 9 Drawing Figs.

[52] U.S. Cl. .................................................. 172/66, 172/754
[51] Int. Cl. ...................................................... A01b 9/00, A01b 15/00
[50] Field of Search .......................................... 172/33, 32, 759, 752, 67, 63, 68, 66, 760, 754

[56] References Cited
UNITED STATES PATENTS

| 1,072,838 | 9/1913 | Downing | 172/760 |
| 1,691,352 | 11/1928 | Hicks | 172/66 |
| 1,369,431 | 2/1921 | Hicks | 172/66X |
| 2,031,188 | 2/1936 | Storey et al. | 172/63X |

FOREIGN PATENTS

| 117,907 | 8/1918 | Great Britain | 172/32 |

*Primary Examiner*—Robert E. Pulfrey
*Assistant Examiner*—Stephen C. Pellegrino
*Attorney*—Waters, Roditi, Schwartz & Nissen ABSTRACT: Apparatus for tilling and breaking soils comprises a share blade; a metal bed to maintain said share blade in a fixed attitude; in a guide means connected to the share blade; a rotating axle at an inclined angle proximate at an arcuate notch formed at the tail end part of the guide means; and a plurality of spiral blades for cutting the soil tilled by said share and inverted and moving along the guiding surface of the guide means, only at the top surface thereof, the cutting blades being fitted at one end thereof on the lower part of the rotating shaft in a manner such that the other end thereof projects beyond the guide surface to receive and cut the soil inverted by the guide means.

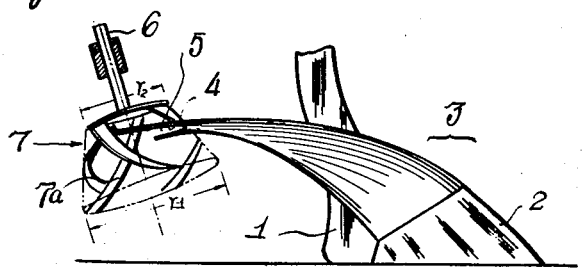
Fig 1
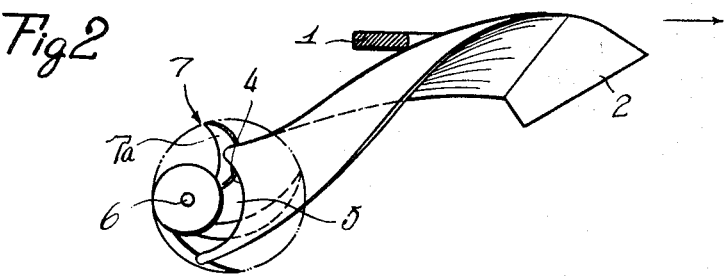
Fig 2
Fig 3
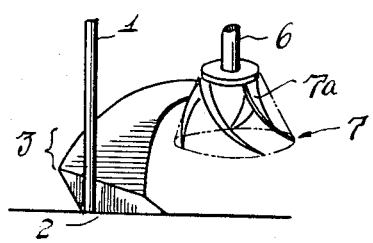
Fig 4
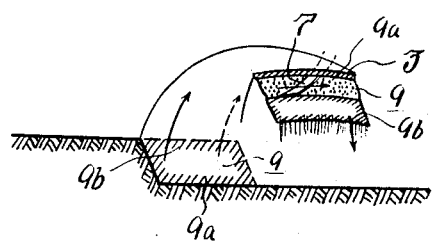
Fig 5
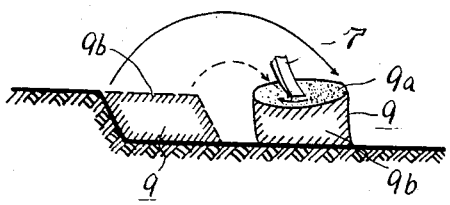

APPARATUS FOR TILLING AND BREAKING SOILS

The present invention relates to apparatus for tilling and breaking soils, and, more particularly, for attaining simultaneously two purposes such that, in farming machinery, tilling and breaking of soils can be effected concurrently in one stroke of plowing action, while weeds and other interposing materials rooted in the surface of the earth are buried deep into the ground by inverting the tilled soil, and concurrently the surface of the tilled soil during turning is made soft and loose by applying breaking action to the back surface side of the soil at a depth not reaching the front surface side where the weeds grow.

In the conventionally known apparatus for tilling and breaking soils, it sometimes happens that breaking of the soil is carried out and the soil is not sufficiently turned or, weeds, and other interposing materials scatter in indefinite directions due to cutting resistance of the blades, failure in cutting, etc. as a result of which the weeds and other interposing materials cannot be buried sufficiently deep into the earth. Also, some other practical disadvantages are that, in the presence of these weeds, it is difficult to render the surface of the earth uniformly flat after completion of the tilling and breaking of soil, and the existence of the unbroken soil hinders the subsequent operations.

It is therefore an object of the present invention to overcome the aforementioned disadvantages, and to remarkably increase accuracy in working as well as efficiency and agricultural productivity.

The object of the present invention will be best understood from the following detailed description thereof taken in conjunction with the accompanying drawing, in which:

FIG. 1 is a side elevational view of apparatus for tilling and breaking soil according to this invention;

FIG. 2 is a plan view of the said apparatus;

FIG. 3 is a back view of the same;

FIGS. 4 and 5 are respective diagrammatic representations for explaining the functions of the tilling and breaking device shown in FIGS. 1 to 3.

Figure 6A:
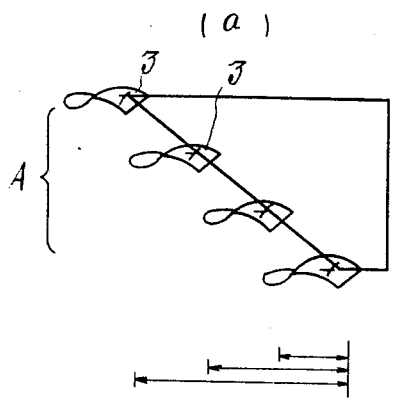
FIGS. 6 and 7 show various applications of the tilling and breaking method according to the present invention.

Referring now to FIGS. 1, 2 and 3, the apparatus for tilling and breaking soils to be used for the method of this invention is constituted by four principal elements comprising a supporting or stabilizing metal bed 1 or any other like part such as a sleigh or a gauge wheel of any appropriate shape which can be properly attached to a farming tractor or the like, a share blade 2, a guide member 3 and a rotary soil-breaking blade unit 7. The share blade 2 is supported by the stabilizing metal bed 1 in a definite positional relationship. The guide member 3 has a curved surface and is connected at one end to the share blade 2 so as to bring the tilled soil up to the maximum point of inversion. At the other end of said guide member 3, there is fitted the soil-breaking blade unit 7. Unit 7 is of a frustoconical shape and is fitted in an arcuate notch 4 formed at the end of guide member 3. The guide member 3 can be constructed in any appropriate shape from a flat plate, a plurality of fork pieces, or plates of curved shape, or the like, and is fitted to the stabilizing metal bed. The blade unit 7 is composed of a plurality of blades 7a having a retreat-escaping angle. The blades are fitted at the bottom of a rotating shaft 6 which is inclined at an angle toward the backward direction with respect to the travelling direction of the share blade so that it may receive the dropping soil at the point of inversion in the guide member. Furthermore, the diameter $r_1$ of the blade unit at the lower part thereof is greater than the diameter $r_2$ at the upper part.

Figure 6B:
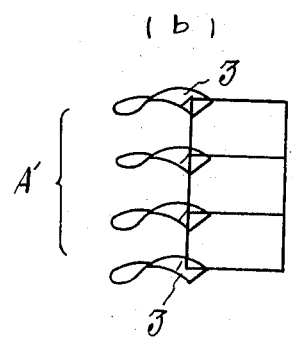
Figure 7A:
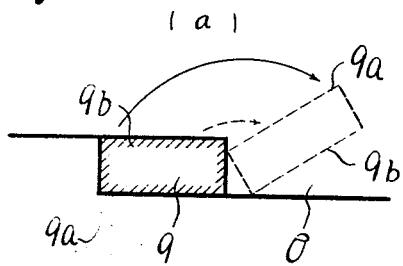
Figure 7B:
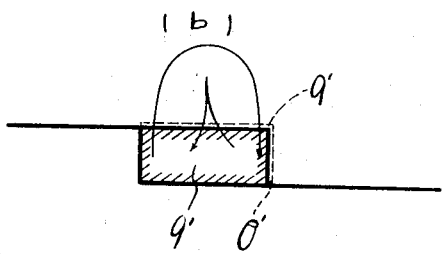

The tilling and breaking device thus contracted is made as one integral unit, and a plurality of units of such device are arranged in parallel each other at regular intervals with respect to the travelling direction of the device as shown in FIG. 6a, or they are arranged in parallel on the same line as shown in FIG. 6b. Otherwise, the device is used as a single unit for throwing the soil 9 into an adjacent trench 8 as shown in FIG. 7a, or for turning the soil 9' up side down at the same place as shown in FIG. 7b.

In such construction of the tilling and breaking device as above-described, the soil is cut into pieces by the share 2 travelling by the farming tractor, on which the stabilizing metal bed 1, or sleigh, or gauge wheel, or a depth controller is equipped, to a certain definite depth and width; the soil travels upwardly along the curved surface of the guide member 3; and is then successively inverted. In this case, as shown in FIG. 2, the soil is guided by both sides of the arcuate notch 4 formed at the end of the guide member 3 so as to be more perfectly inverted, i.e., in such a manner that the bottom surface, or back surface side 9a of the soil 9 may be turned up side down. The soil is further supported and guided by the guide member 3, and, even when it is forceably ejected from the notch 4 at the end of the guide member 3, the inverted soil 9 is still held in position in the space between guide member 3 and blade unit 7 by both sides of the recess 5 of the notch 4 and upon further pushing force imparted to the soil, only the upper half of the soil is subjected at its rear surface 9a to the primary cutting action by the soil breaking blade unit 7 driven by the shaft 6 and tilted so as to render the forward part (to the side of the guide member) higher than the rearward part (see FIG. 4). The soil thus broken into small pieces is dropped in the direction of inversion with the original surface of the soil 9b being inverted and unbroken.

Subsequently as the share 2 and the guide member 3 continues travelling, the soil-breaking blades 7a also continue in rotation, whereby the dropped broken soil undergoes a secondary cutting action by the back portion of blade unit 7 in the reverse direction to that of the primary cutting action. (see FIG. 5) Thus, the inverted soil 9 is cut at its back surface 9a alone twice in different directions of arcuate shape, thereby completing the cutting (or breaking) operation in succession.

In a conventional tilling and breaking device, wherein a vertical shaft, rotary type soil-cutting blade is provided at the tail end, or at a rearward position of the guide member in continuation to the share, the soil is entirely cut from its rear surface up to the front surface with the consequence that there inevitably become exposed on the surface of the soil after the tilling operation, weeds, roots of crops, straw, etc., and further the broken soil scatters about like a cloud of dust.

In contrast thereto, according to the method of this invention, the soil is perfectly inverted by the aforementioned actions of the share 2 and the guide member 3, so that, weeds, roots of crops, straw, etc. can be well buried deep into the earth and, at the same time, since the primary cutting action is conducted on the inverted upper surface along with the soil in the course of its inversion in a state of it being held in space, the breaking (or cutting) action can be applied sufficiently to the soil in the well arranged state, which adds to the avoidance of scattering of the soil in all directions due to the cutting resistance of the blade, thus securing uniform cutting of the soil. Furthermore, in the secondary cutting, where the broken soil which has undergone the primary cutting and dropped from the guide member along with the inverted soil, less resistance exists at this stage in view of the fact that the soil has been already broken to some extent. Also, weeds and other mixed materials are substantially nonexistent at the cutting surface due to the perfect inversion of the soil, on account of which they do not scatter, and the direction of the cutting is reverse to that of the primary cutting, which gives sufficient breaking action to the soil.

In conclusion, by the method of this invention, all the interposing materials such as weeds, etc. become buried in the ground by perfect inversion of the soil, remains unbroken, since it is in the state of being held tightly by the roots of weed or crops. Accordingly, the present method exhibits a particularly remarkable effect in that weeds, roots of crops, straw etc. can be buried in the ground without their being exposed to the surface the tilled surface is covered with fine, soft, and loosened soil as a result of extensive soil-breaking operations.

We claim:

1. Apparatus for tilling and breaking soil and adapted for being towed by farming machinery, said apparatus comprising: a share blade for plowing soil, a vertical supporting member mounted on the apparatus and secured to said share blade to maintain positional stability of said share blade, a curved surface guide means directly connected to said share blade for inverting a chunk of tilled soil received from said share blade while the soil is being carried rearwardly along said curved surface guide means, said curved surface guide means having an end remote from said share blade with an arcuate notch thereat, a blade unit mounted on the apparatus and including a plurality of spiral blades disposed in close proximity and in confrontation to said notch of said curved surface guide means and extending a given distance therebelow for breaking up the top portion of the inverted chunk of tilled soil as inverted by said curved surface guide means and whereafter said inverted chunk of soil is deposited on the ground, a rotary shaft means mounted on said apparatus and supporting said blade unit for rotating said blades, said rotary shaft means being disposed at a downwardly inclined angle in the forward direction of travel of said apparatus to cause said blades at the rear of said blade unit to cut only the top surface of the deposited inverted chunk of soil as the unit passes thereover.

2. Apparatus as claimed in claim 1, in which said spiral blades are shaped to define an increase in diameter for said blade unit, downwardly of the axis of said rotary shaft means.